(12) United States Patent
Ogg

(10) Patent No.: US 7,103,940 B2
(45) Date of Patent: Sep. 12, 2006

(54) REMOVEABLE HANDLE

(75) Inventor: Richard K. Ogg, Littlestown, PA (US)

(73) Assignee: Ogg Design, Inc., Littlestown, PA (US)

( * ) Notice: Subject to any disclaimer, the term of this patent is extended or adjusted under 35 U.S.C. 154(b) by 63 days.

(21) Appl. No.: 10/825,232

(22) Filed: Apr. 16, 2004

(65) Prior Publication Data

US 2005/0011050 A1    Jan. 20, 2005

Related U.S. Application Data

(60) Provisional application No. 60/463,522, filed on Apr. 18, 2003.

(51) Int. Cl.
*A45C 13/22* (2006.01)

(52) U.S. Cl. .......................... 16/425; 16/422

(58) Field of Classification Search ................. 16/425, 16/421–423, 436; 294/27.1, 31.2, 150, 153–154, 294/157, 165; 429/187; 215/396; 220/759, 220/770, 771
See application file for complete search history.

(56) References Cited

U.S. PATENT DOCUMENTS

| | | | | | |
|---|---|---|---|---|---|
| 1,908,834 | A | * | 5/1933 | Engberg et al. | ............. 74/558.5 |
| 2,364,105 | A | * | 12/1944 | Socke | ...................... 16/411 |
| 2,984,486 | A | * | 5/1961 | Jones | ......................... 473/568 |
| 3,635,382 | A | * | 1/1972 | Wilson | ....................... 294/166 |
| 3,981,043 | A | * | 9/1976 | Curry | ........................... 16/430 |
| 4,120,073 | A | * | 10/1978 | Studebaker | ................... 294/33 |
| 4,257,525 | A | * | 3/1981 | Thompson | .................. 215/396 |
| 4,363,415 | A | * | 12/1982 | Rainville | ..................... 215/396 |
| 4,890,355 | A | * | 1/1990 | Schulten | ....................... 16/421 |
| 4,915,241 | A | | 4/1990 | Morimura et al. | |
| 5,469,612 | A | | 11/1995 | Collette et al. | |
| 5,637,167 | A | | 6/1997 | Krishnakumar et al. | |
| 5,664,520 | A | * | 9/1997 | Latimer, III | .................. 16/421 |
| 5,738,401 | A | * | 4/1998 | Fan | ............................. 294/171 |
| 5,836,469 | A | | 11/1998 | Zebrowski | |
| 5,918,754 | A | | 7/1999 | Lyons et al. | |
| 5,988,418 | A | | 11/1999 | Maeshima | |
| 6,444,158 | B1 | | 9/2002 | Grob et al. | |
| 6,460,715 | B1 | | 10/2002 | Yonemori et al. | |
| 6,839,940 | B1 | * | 1/2005 | Harman | ..................... 16/110.1 |

FOREIGN PATENT DOCUMENTS

| | | | | |
|---|---|---|---|---|
| DE | 4016592 | C | * | 5/1991 |
| GB | 2228860 | A | * | 9/1990 |
| GB | 2349072 | A | * | 10/2000 |
| JP | 08053138 | A | * | 2/1996 |
| JP | 08324574 | A | * | 12/1996 |
| WO | WO 9404393 | A1 | * | 3/1994 |

* cited by examiner

*Primary Examiner*—Chuck Y. Mah
(74) *Attorney, Agent, or Firm*—Berenato, White & Stavish, LLC

(57) ABSTRACT

The present invention is directed to a container with a removable handle. The container has spaced first and second knobs. The handle is configured as a split tubular member having a central portion and spaced internal first and second contoured portions proximate opposite ends thereof. Each of the contoured portions is configured to receive one of the knobs. The first and second contoured portions tensionably engage the first and second knobs when the central portion is grasped by a user. A method of securing the handle to the container is also disclosed.

18 Claims, 10 Drawing Sheets

REMOVEABLE HANDLE

CROSS-REFERENCE TO RELATED APPLICATION AND CLAIM TO PRIORITY

This application is based on provisional application Ser. No. 60/463,522, filed Apr. 18, 2003, for Richard K. Ogg, the disclosure of which is incorporated herein by reference and to which priority is claimed under 35 U.S.C. §120.

FIELD OF THE INVENTION

The present invention is directed to a removable handle, and a container with a removable handle. The container has spaced first and second knobs. The handle is configured as a split tubular member having a central portion and spaced internal first and second contoured portions proximate opposite ends thereof. Each of the contoured portions is configured to receive one of the knobs. The first and second contoured portions tensionably engage the first and second knobs when the central portion is grasped by a user. A method of securing the handle to the container is also disclosed.

BACKGROUND OF THE INVENTION

Various designs for containers and handles, such as a plastic PET (polyethylene terephthalate) bottle having a handle, have been developed. However, it is technically difficult and relatively expensive to mold a handle integrally with a side portion of a bottle. Therefore, some designs provide for a separately molded handle that is then permanently attached to the side of the bottle. Some designs provide that the formed handle is embedded into the bottle body as the bottle is being formed. However, such designs are relatively expensive and require special molds for forming the bottle around the handle.

Other designs provide for a separately formed handle that is snapped into a corresponding groove in the bottle body. However, such designs are not removeable. In addition, they are relatively expensive to manufacture given they are typically formed using a relatively large amount of material.

Other designs provide for a strap which is adhesively bonded to the side of the bottle. Although such handles are cheaper to manufacture than others, there is the additional cost of the adhesive. In addition, they typically cannot support heavier bottles, such as larger PET bottles.

Therefore there is a need for a handle, and resulting container system, that is inexpensive to manufacture, durable, removable, and able to support relatively heavy containers.

SUMMARY OF THE INVENTION

The disclosed invention is directed to a handle that may be removably attached to a container. A user may pick-up and change the position of the container with which the removable handle is associated.

A container with a removable handle is disclosed. The container has spaced first and second knobs. The handle is configured as a split tubular member having a central portion and spaced internal first and second contoured portions proximate opposite ends thereof. Each of the contoured portions is configured to receive one of the knobs. The first and second contoured portions tensionably engage the first and second knobs when the central portion is grasped by a user.

The present invention is also directed to a removable handle. The removable handle comprises a split tubular member having a central portion and spaced internal first and second contoured portions proximate opposite ends thereof. The first contoured portion is configured to receive a first knob. The second contoured portion is configured to receive a second knob. The first and second contoured portions tensionably engage the first and second knobs when the central portion is grasped by a user.

A method of securing a handle to a container is disclosed. A container having spaced first and second knobs and a split tubular member are provided. The tubular member has a central portion and spaced internal first and second contoured portions proximate opposite ends thereof. Each of the contoured portions are configured to receive one of the knobs. The first and second contoured portions are aligned with the first and second knobs. The first and second contoured portions are then engaged around the first and second knobs. The first and second contoured portions are tensioned against the first and second knobs by grasping the central portion and thereby applying a force to the central portion.

DETAILED DESCRIPTION OF THE INVENTION

Figure 6:
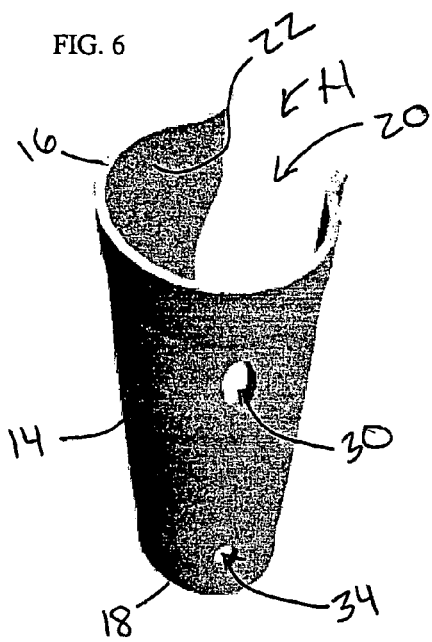
FIG. 6 is a perspective view of a handle according to an embodiment of the present invention.
Figure 7:
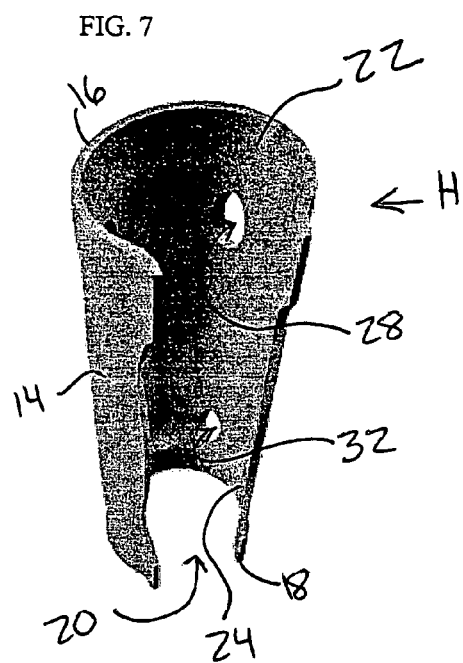
FIG. 7 is a perspective view of the handle system shown in FIG. 6 viewed from a different angle.
Figure 5:
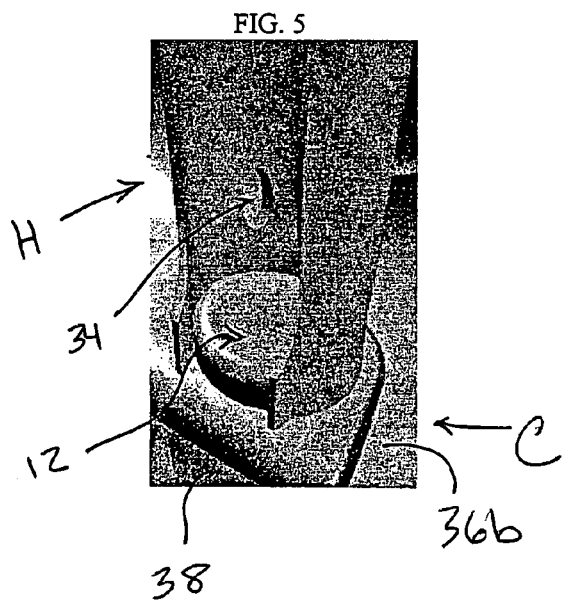
FIG. 5 is a fragmentary perspective view of the handle system shown in FIG. 1 viewed from a different angle.
Figure 8:
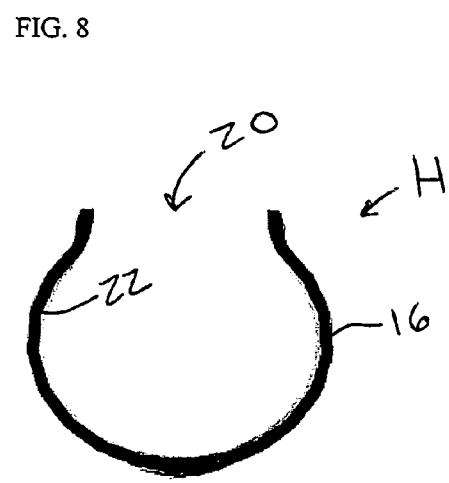
FIG. 8 is a top view of the handle shown in FIG. 6.

A container C and removable handle H according to a first embodiment of the present invention is best shown in FIGS. 1–5. Container C includes spaced first and second knobs 10, 12. As best shown in FIGS. 6–8, handle H is a split tubular member having a central portion 14 and first and second ends 16, 18. A gap 20 extends longitudinally from first end 16 to second end 18. Spaced internal first and second contoured portions 22, 24 are proximate opposing first and second ends 16, 18, respectively.

Figure 22:
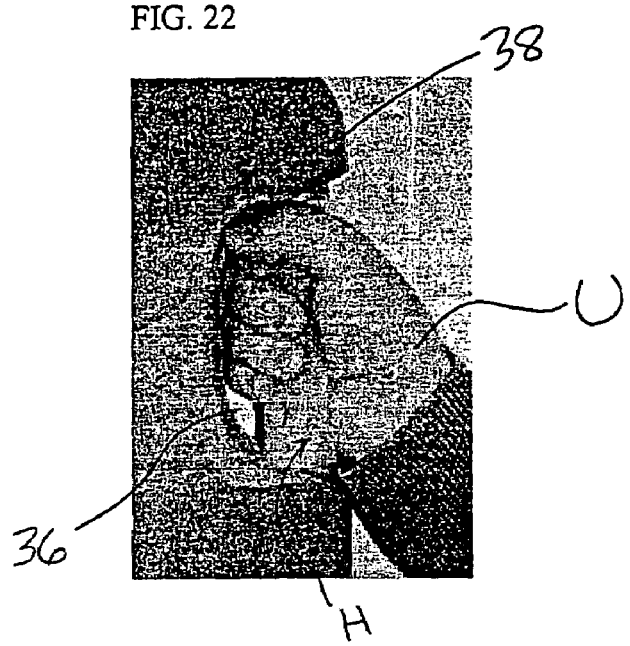
FIG. 22 is a fragmentary perspective view of the container of FIG. 21 showing a user grasping the handle.

Contoured portion 22 is configured to receive knob 10, and contoured portion 24 is configured to receive knob 12, as shown in FIGS. 1–5. Handle H is formed from a flexibly resilient material. Preferably, handle H is formed from plastic, more preferably injection molded plastic such as PET, ABS, HDPE, and the like. The flexible nature of handle H allows first and second contoured portions 22, 24 to tensionably engage first and second knobs 10, 12, respectively, when central portion 14 is grasped by a user U, as best shown in FIG. 22.

Alternatively, handle H may be formed from metal that is sufficiently thin and flexible to allow handle H to be compressed inwardly, thereby tensioning contoured portions 22, 24 against knobs 10, 12. Alternatively, handle H may be formed from a wood composite, such as plywood, which would permit the requisite flexibility. The specific material from which handle H is formed is partially dependent on the particular objects with which handle H will be used. Further, the attachment of handle H onto the object is partially dependent on the flexibility of the material used to manufacture handle H.

As best shown in FIGS. 6–8, contoured portions 22, 24 are preferably C-shaped in cross-section. The entire split-tubular member may be C-shaped in cross-section having a given length in the axial direction. Central portion 14 may have a similar cross-sectional configuration compared to contoured portions 22, 24. Central portion 14 may also have a variable cross-sectional configuration to provide an ergonomically suitable fit to the human hand.

Figure 9:
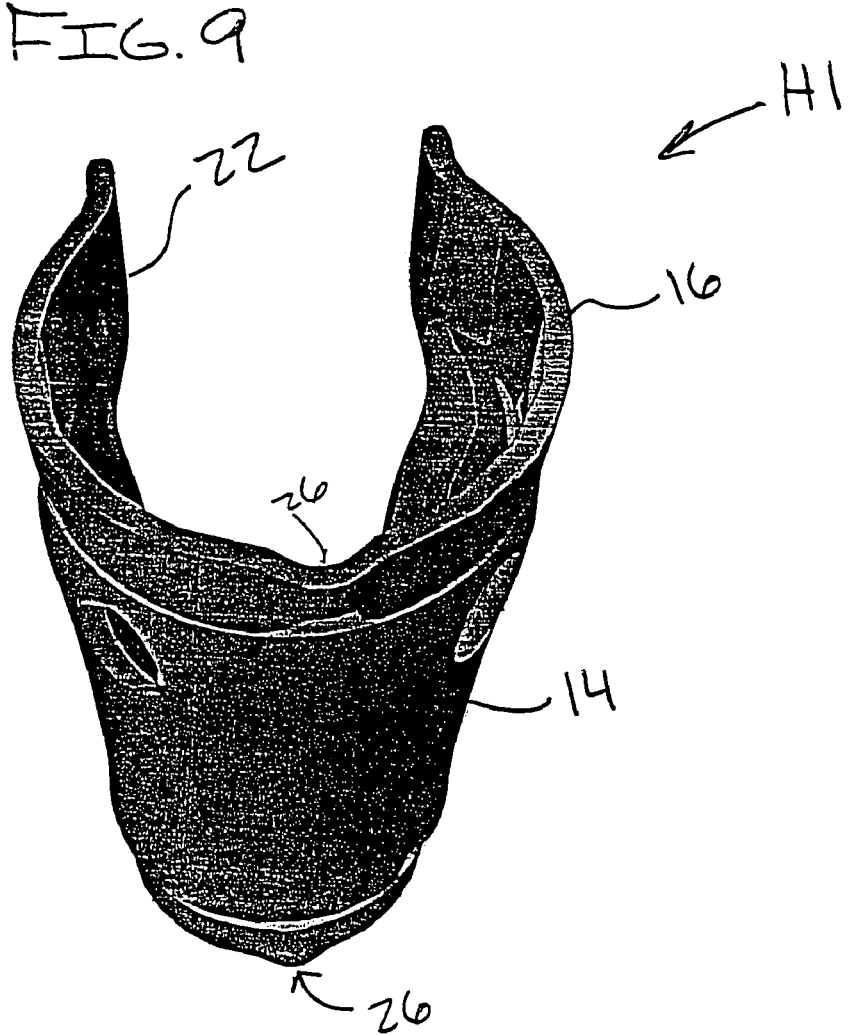
FIG. 9 is a perspective view of a handle according to another embodiment.
Figure 10:
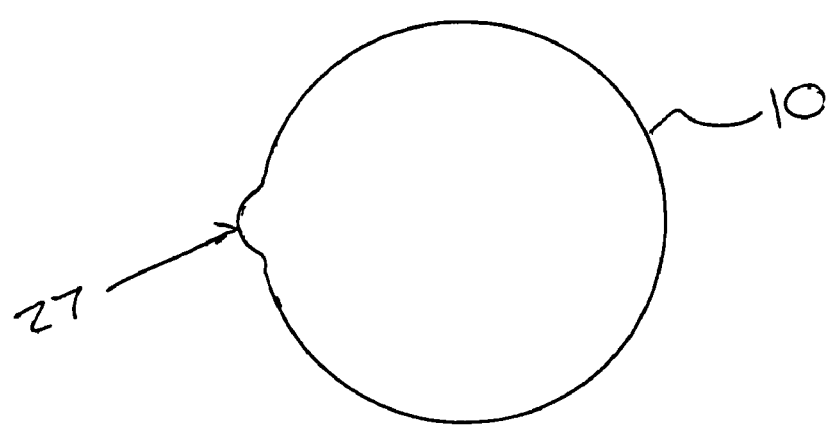
FIG. 10 is a top view of a container knob according to another embodiment.

In another embodiment, a handle H1 includes a dimple 26 extending outwardly from a periphery of at least one of contoured portions 22, 24, as best shown in FIG. 9. A corresponding one of the knobs 10, 12 may include a lug 27 extending outwardly therefrom, as best shown in FIG. 10. Lug 27 extends outwardly from knob 10, 12 so that it may engage dimple 26 on handle H1 when handle H1 is installed on container C, thereby minimizing rotation of contoured portions 22, 24 on knobs 10, 12. Dimple 26 clips around lug 27 when handle H is rotated into position. Handle H1 may be easily removed by rotating dimple 26 away from lug 27.

Central portion 14 of handle H (or handle H1) may have a diameter that is different than contoured portions 22 and/or 24. Alternatively, the diameters of central portion 14 and contoured portions 22, 24 may be substantially the same. Contoured portion 22 may have a diameter the same as or differing from the diameter of contoured portion 24.

Figure 3:
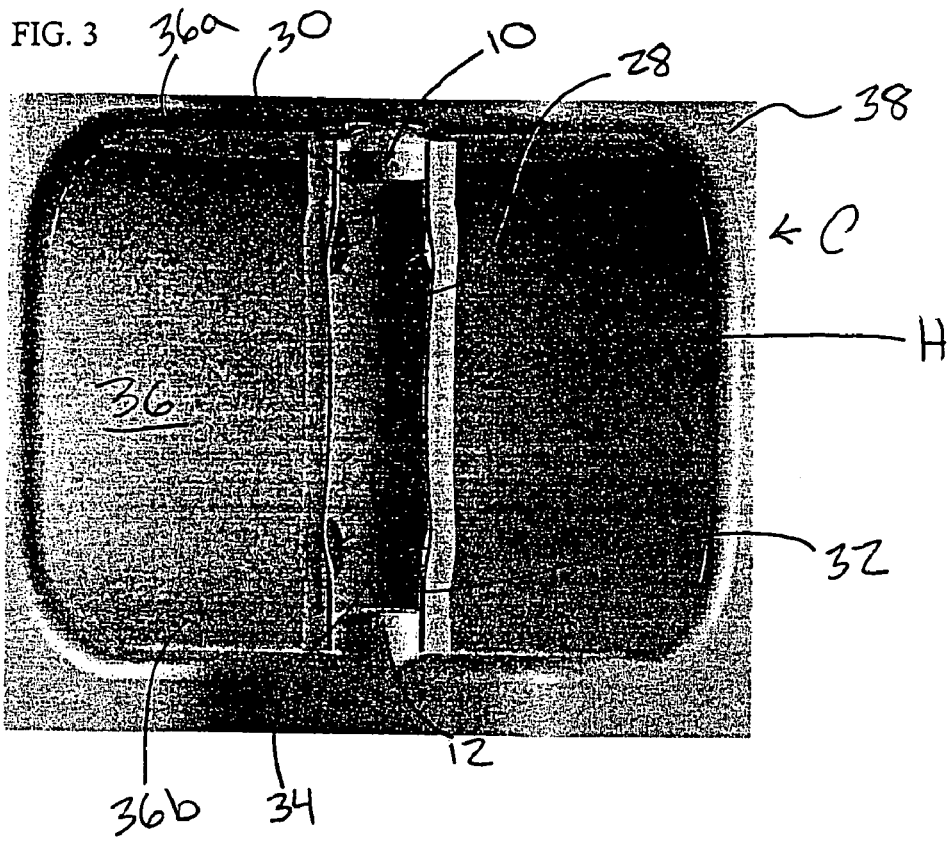
FIG. 3 is a front view of the handle system shown in FIG. 1.
Figure 4:
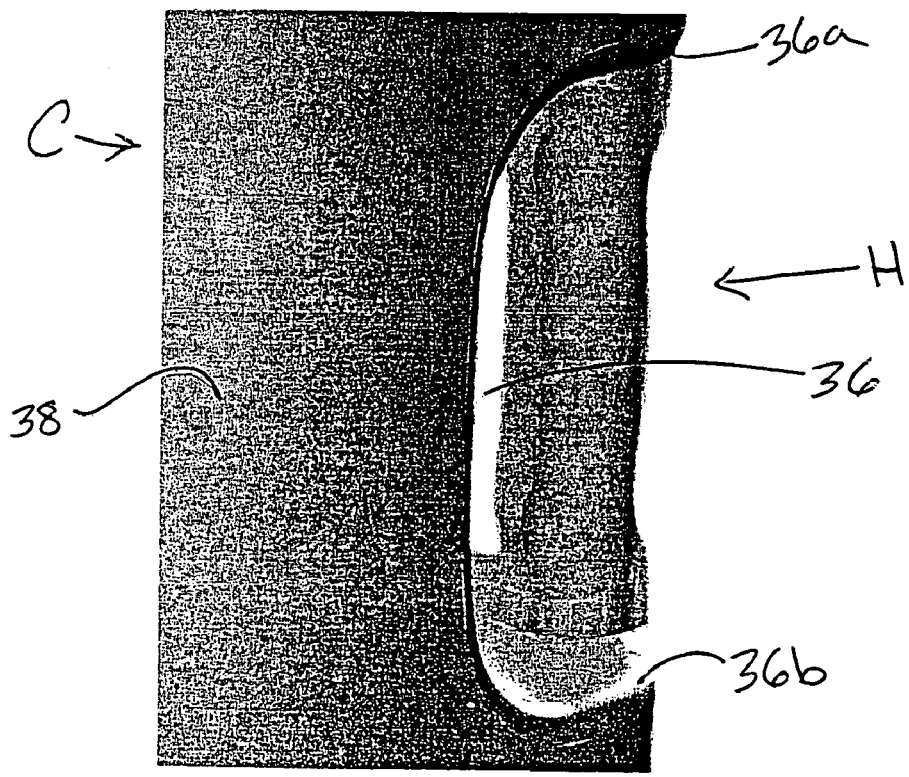
FIG. 4 is another perspective view of the handle system shown in FIG. 1.

Central portion 14 may include one or more openings 28. Preferably, central portion 14 includes at least two radially spaced openings 28, 30 proximate first contoured portion 22. Spaced openings 28, 30 may be axially aligned with each other, as best shown in FIGS. 3 and 7. Each opening 28, 30 preferably has either an elliptical or circular configuration. Central portion 14 may also include two radially spaced openings 32, 34 proximate second contoured portion 24. Spaced openings 32, 34 may also be axially aligned from each other, with either an elliptical or circular configuration.

In one embodiment, spaced first and second knobs 10, 12 are positioned in a recess 36 of a side 38 of container C, as best shown in FIGS. 1–5 and 19–22. Knobs 10, 12 extend from opposing ends 36a, 36b of recess 36. Knobs 10, 12 may be configured as a cylindrical or elliptical protuberance, which extends from ends 36a, 36b in an axial direction relative to container C. Preferably, knobs 10, 12 are axially aligned with each other. Knobs 10, 12 are configured to receive contoured portions 22, 24, respectively. Thus, contoured portions 22, 24 are configured to correspond to the protruding knobs 10, 12 to which handle H is to be attached. Preferably, knobs 10, 12 are positioned in recess 36 to allow sufficient space for a user's hand to grip and tighten around the removable handle, as best shown in FIG. 22. When the user grips handle H, handle H tensioned against knobs 10, 12, thereby preventing it from becoming dislodged.

Figure 11:
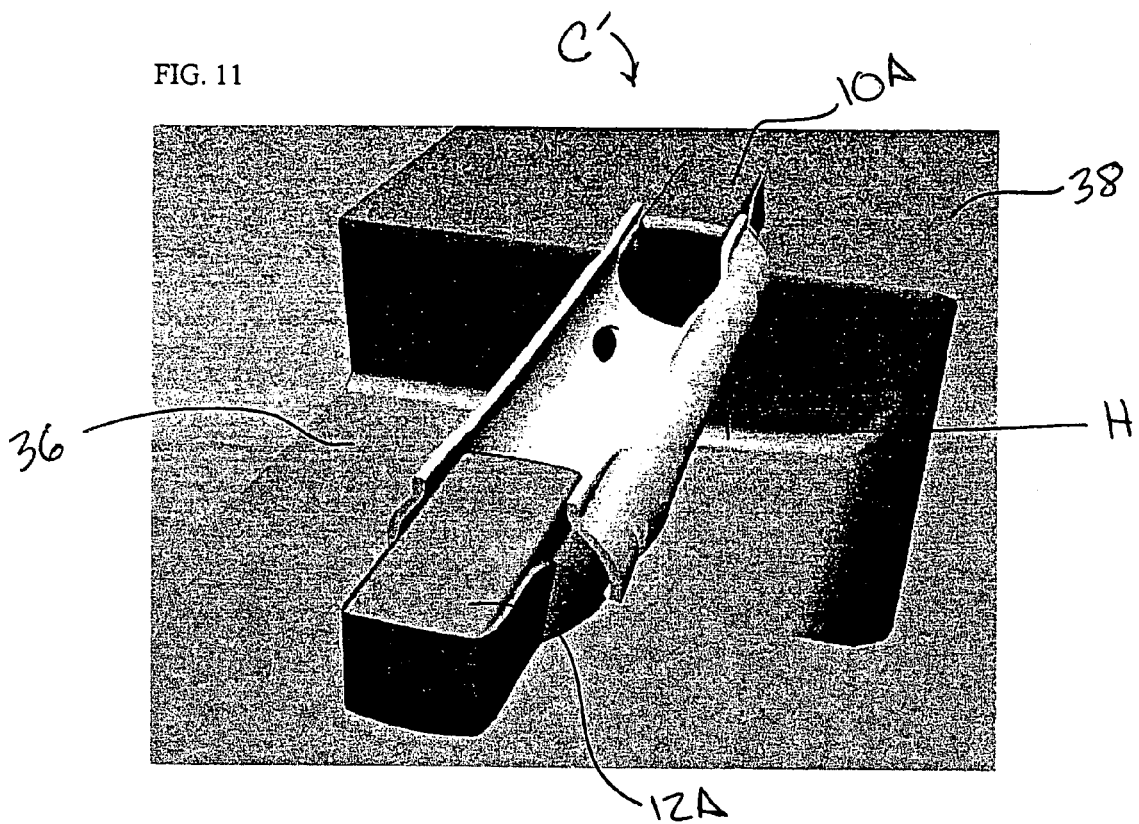
FIG. 11 is a perspective view of a side of a container showing a handle system according to another embodiment.
Figure 12:
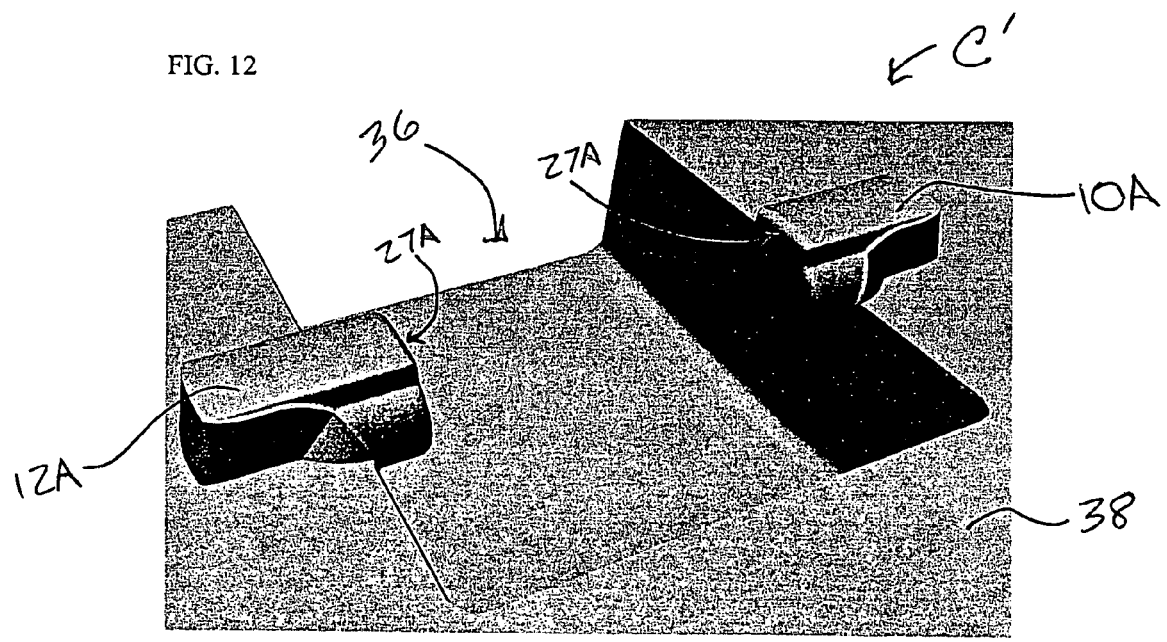
FIG. 12 is a perspective view of the side of the container of FIG. 11 showing the knobs without the handle secured thereto.
Figure 13:
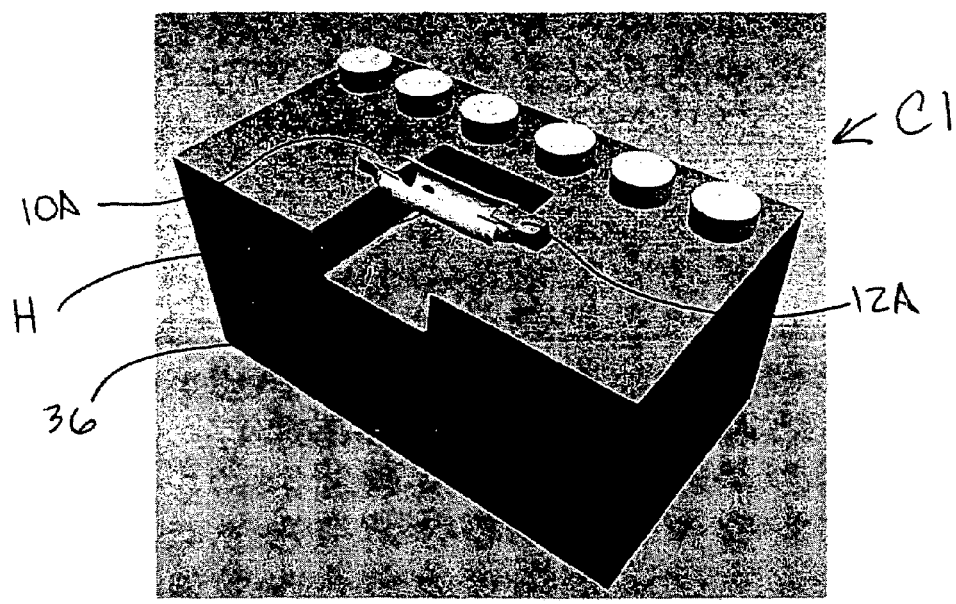
FIG. 13 is a perspective view of a battery casing having a handle system according to an embodiment of the present invention.

Knobs 10, 12 may be positioned in recess 36 so that they do not extend outwardly beyond the plane of side 38 of container C, as best shown in FIGS. 1–5 and 19–22. Alternatively, knobs 10A, 12A extend outwardly beyond the plane of side 38 of container C', as best shown in FIGS. 11–12. Container C' includes a recess 36, as described above. In addition, handle H (or handle H1) may be used with knobs 10A, 12A, as best shown in FIG. 11. Knobs 10A, 12A may be configured to include a lug 27A that extends into gap 20 proximate contoured portions 22, 24 when handle H is in position on knobs 10A, 12A. It should be understood that the specific characteristics and dimensions of knobs 10, 12 or 10A, 12A (e.g. size, mass, material) may vary depending on the mass, weight and size of the container C. Accordingly, the size and cross-sectional configuration of handle H may also vary, but will be configured so that knobs 10, 12 may be received in and mate with contoured portions 22, 24.

It should also be understood that handle H (or handle H1) may be utilized with any container C having spaced knobs 10, 12 (or 10A, 12A), such as plastic traffic barriers, plastic drums and other containers. Handles are not easily added to such objects during their initial manufacture. As such, the present invention provides an easy and inexpensive alternative. Various embodiments are disclosed herein for purposes of explanation. It should be understood, however, that the disclosed invention is not limited to same.

Figure 14:
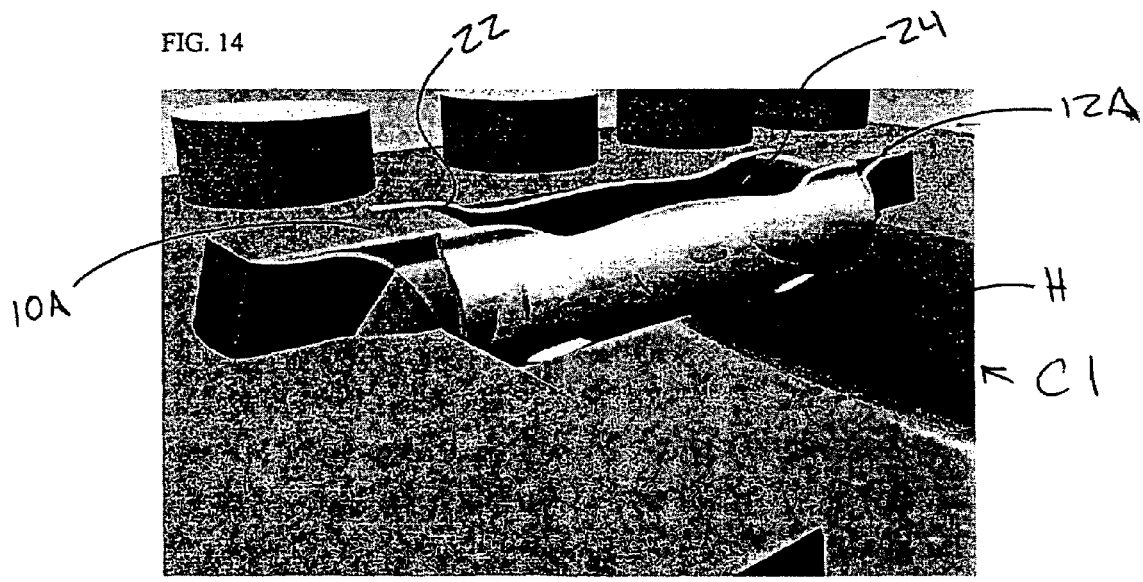
FIG. 14 is a fragmentary perspective view of the battery casing of FIG. 13 showing an exploded view of the handle system.
Figure 15:
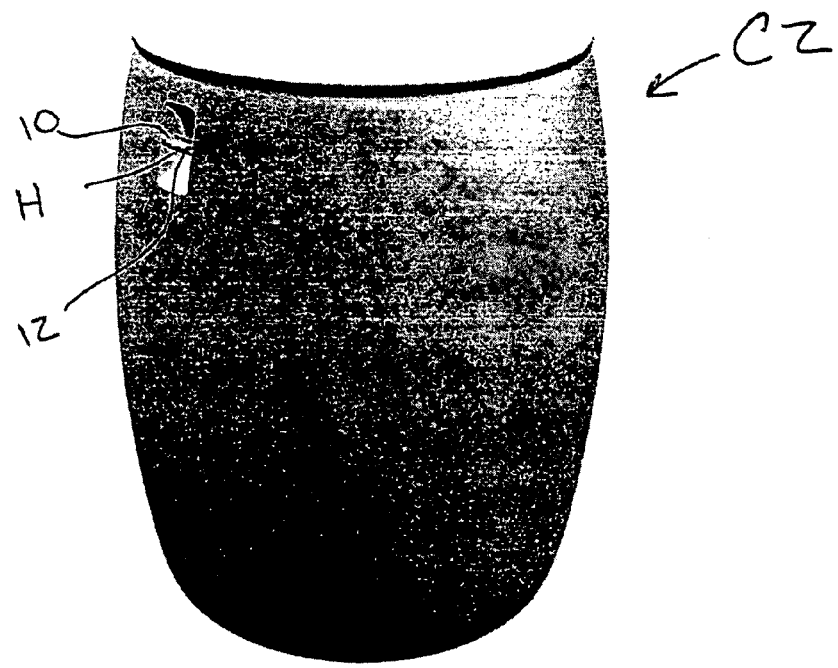
FIG. 15 is a perspective view of a drum having a handle system according to an embodiment of the present invention.
Figure 16:
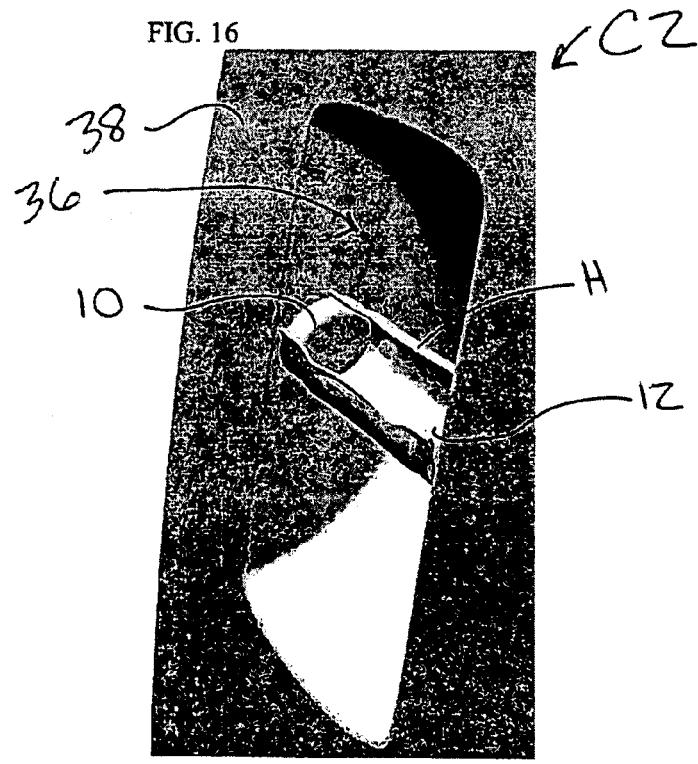
FIG. 16 is a fragmentary perspective view of the drum of FIG. 15 showing an exploded view of the handle system.
Figure 17:
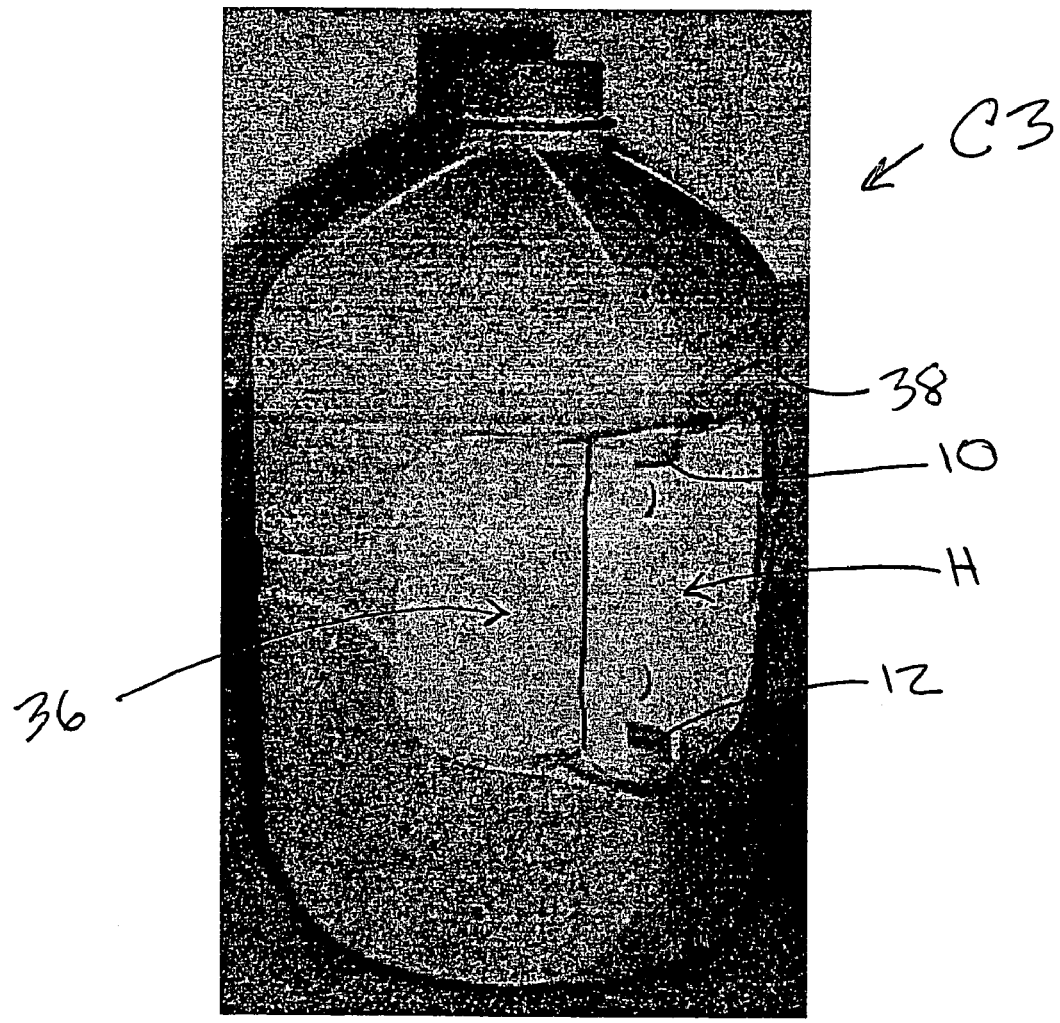
FIG. 17 is a perspective view of a bottle having a handle system according to an embodiment of the present invention.
Figure 18:
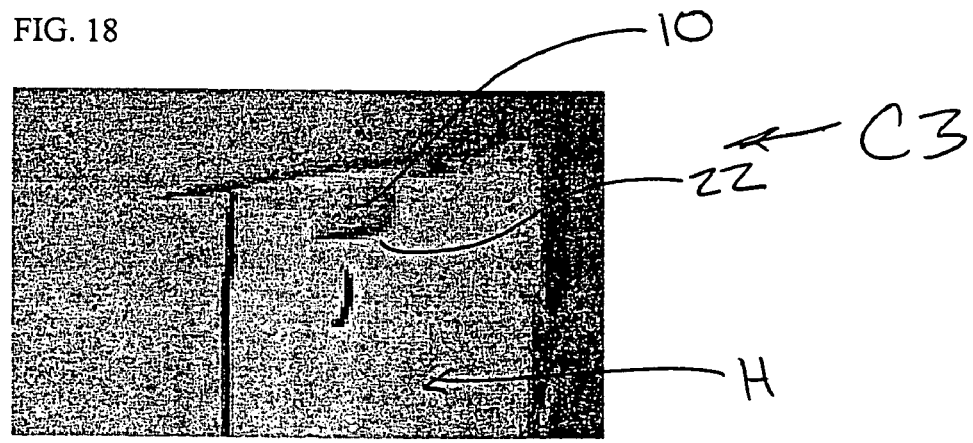
FIG. 18 is a fragmentary perspective view of the bottle of FIG. 17 showing an exploded view of the handle system.
Figure 19:
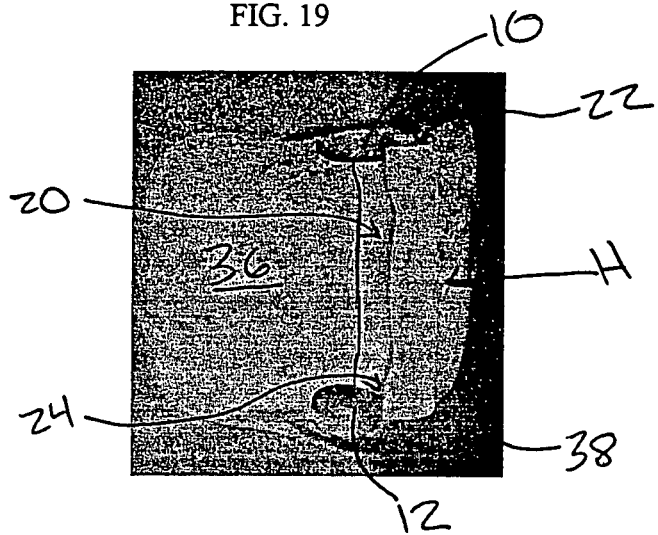
FIG. 19 is a fragmentary perspective view of a side of a container according to the present invention showing a handle partially engaging the container knobs.

In one embodiment, a plastic casing C1 of an automotive battery includes spaced knobs 10A, 12A, as best shown in FIGS. 14 and 15. Handle H engages knobs 10A, 12A on casing C1 as described above. In another embodiment, a plastic drum C2 includes spaced knobs 10, 12, as best shown in FIGS. 16 and 17. Handle H engages knobs 10, 12 on drum C2 as described above. In another embodiment, a plastic bottle C3, such as a PET bottle, includes spaced knobs 10, 12, as best shown in FIGS. 18 and 19. Handle H engages knobs 10, 12 as described above.

Figure 20:
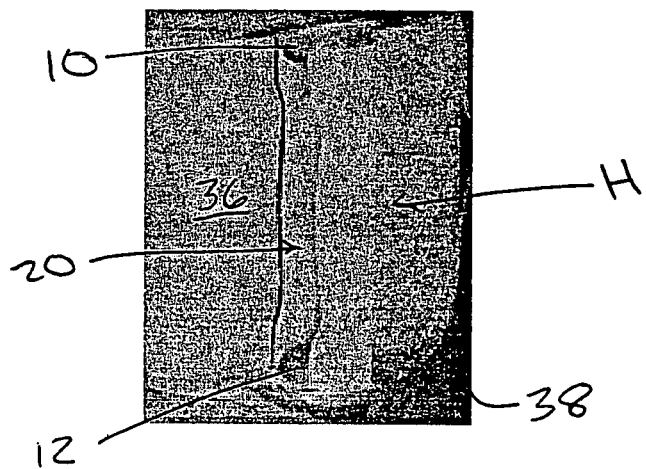
FIG. 20 is a fragmentary perspective view of the container side of FIG. 19 showing the handle fully engaging the container knobs.
Figure 21:
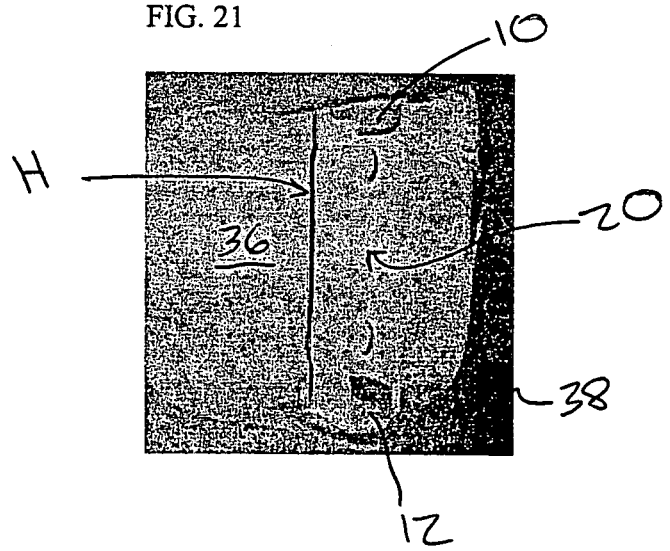
FIG. 21 is a fragmentary perspective view of the container side of FIG. 20 showing the handle after it has been rotated 90° axially about the knobs.

The present invention is also directed to a method of securing handle H to container C. Contoured portions 22, 24 are aligned with knobs 10, 12, as best shown in FIG. 19. Knobs 10, 12 are pushed through gap 20 and into contoured portions 22, 24, and engaged by contoured portions 22, 24 due to the corresponding configurations, as best shown in FIG. 20. Handle H may then be rotated so that gap 20 faces away from container C, as best shown in FIG. 21. When handle H is grabbed by a user U, knobs 10, 12 are tensionably engaged by contoured portions 22, 24, as best shown in FIG. 22.

Figure 23:
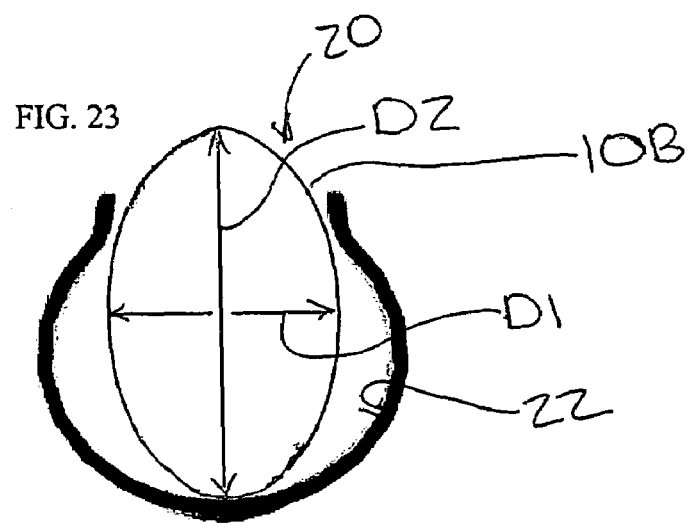
FIG. 23 is a top view of an elliptical knob and handle according to another embodiment.
Figure 24:
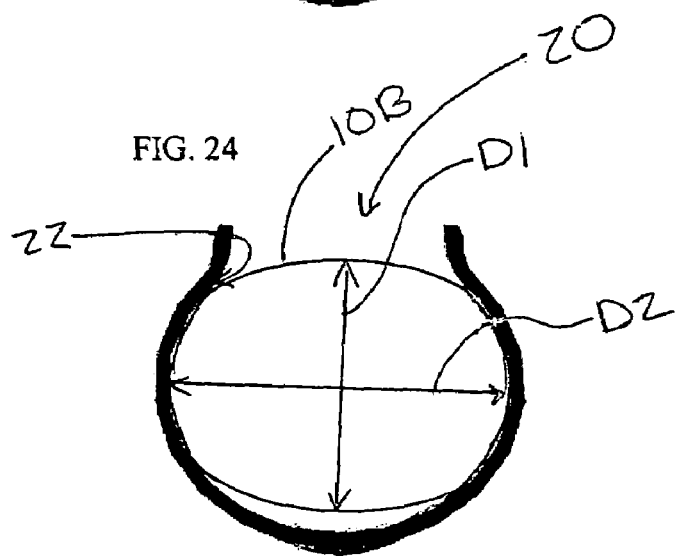
FIG. 24 is a top view of the knob and handle of FIG. 23 after the handle has been rotated 90° axially about the knob.

Knobs 10, 12 may have a cylindrical or elliptical configuration, with contoured portions 22, 24 having corresponding configurations to receive knobs 10, 12. As best shown in FIGS. 23 and 24, knobs 10B (or 12B) has an elliptical configuration with an axial diameter D1, which is less than a longitudinal diameter D2. Handle H is aligned with knobs 10B, 12B so that the axial diameter D1 of knobs 10, 12 is pushed through gap 20 and into contoured portions 22, 24. Handle H may then be rotated about knobs 10B, 12B about 90°, so that the longitudinal diameter D2 of knobs 10B, 12B blocks gap 20 and minimizes the possibility of handle H disengages from container C, as best shown in FIG. 24. However, handle H may be easily removed again by simply rotating handle H so that the axial diameter of knobs 10B, 12B is again aligned with gap 20. Handle H may then be easily slipped off of knobs 10B, 12B.

Figure 1:
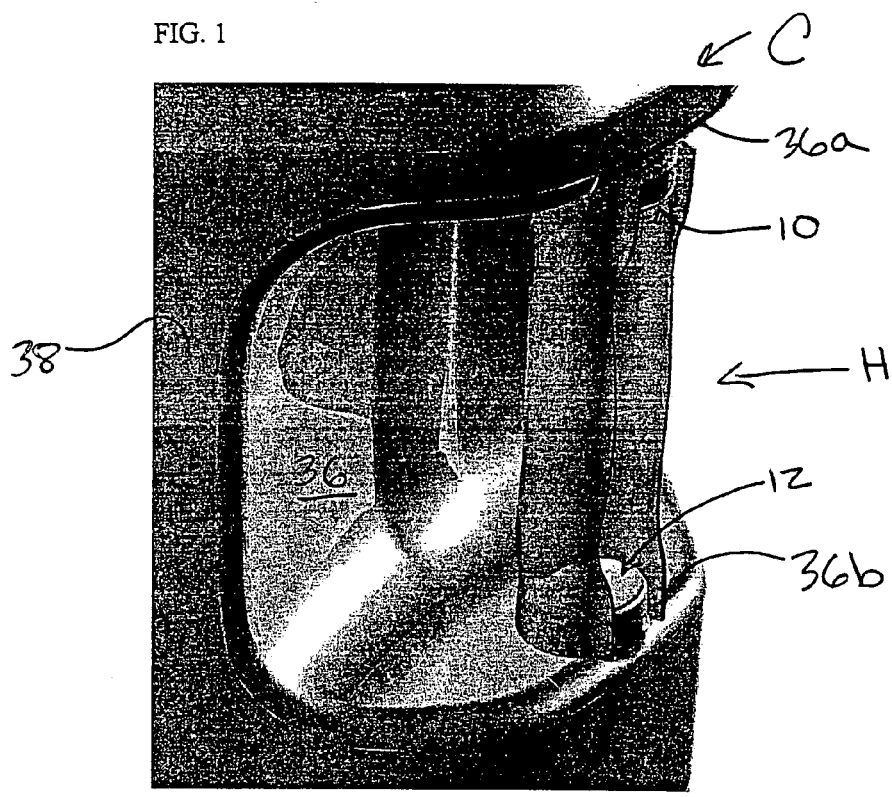
FIG. 1 is a fragmentary perspective view of a side of a container showing a handle system according to an embodiment of the present invention.
Figure 2:
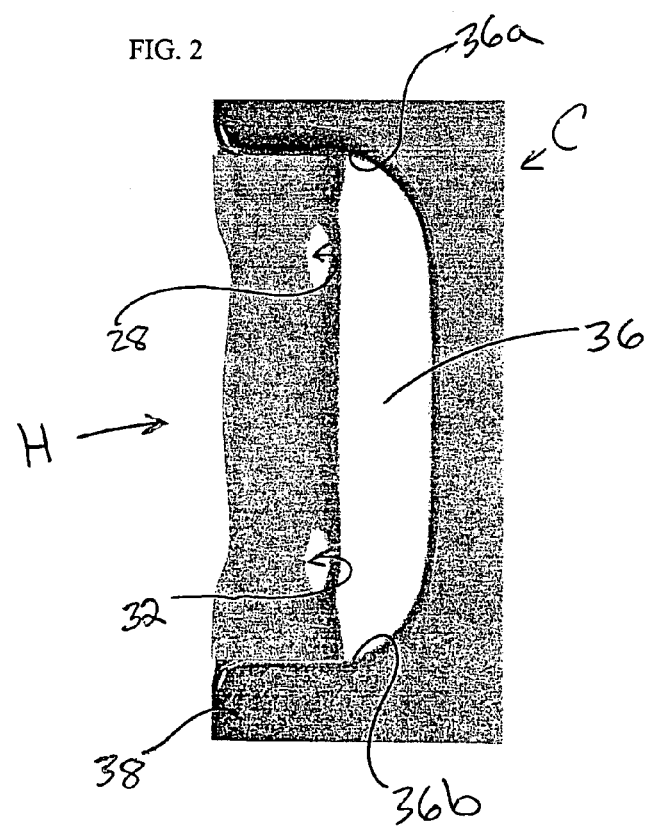
FIG. 2 is a side view of the handle system shown in FIG. 1.

Handle H may be inserted onto container C via a machine having rods for engaging spaced openings 28, 30 and 32, 34. A rod passes through opening 28, through gap 20 of central portion 14, and out through opening 30. Likewise, a second rod may be passed through opening 32, through gap 20, and out through opening 34. The rods are perpendicular to the main axis of handle H. Openings 28, 30 and 32, 34 are aligned and thereby create a passageway for the insertion of two rods or tabs that facilitate the installation of handle H onto container C, as best shown in FIG. 2. Openings 28, 30 and 32, 34 allow for the rods or tabs to hold handle H in position when aligning and then engaging knobs 10, 12 with contoured portions 22, 24. Then, the rods or tabs are rotated, thereby rotating handle H into position. Once the handle H is in the desired position on container C, the robs or tabs are retracted out from openings 28, 30 and 32, 34, thereby releasing handle H. Of course, handle H may also be removably secured to container C manually rather than by a machine.

Ends 16, 18 of removable handle H are preferably approximately 90° in relation to the major axis of the split tubular member. This configuration creates a single axis on which the insertion, rotation, and location of handle H onto container C is accomplished. The length and/or the height of handle H are partially dependent on the material construction of the object to which handle H is to be installed. The material construction of the object also influences whether handle H is "free floating" on knobs 10, 12, or whether a compression force will be applied to each end of handle H when installing it on the object. A compression fit may be appropriate for some objects that are semi-flexible. A relatively tight, compression fit between handle H and the object minimizes the possibility that the handle will become loose or easily removed from the object. Thus, a compression fit may add a level of security to the object and handle H. For objects that are relatively rigid and non-flexible, a compression fit may not be appropriate and/or required.

Any number of objects could benefit from the disclosed invention. The ease of handling such objects and containers is greatly improved by the present invention. Furthermore, additional safety is provided when moving such objects in that the handle may be removed once the object is in a desired position. The handle may then be easily removed. Movement of the objects without the handle is much more difficult, thereby thwarting unauthorized users from moving the objects.

Handle H may be easily attached to any object or container C having spaced knobs 10, 12. Handle H may be formed in any desired length, so long as the resulting length is compatible with the spaced knobs 10, 12 on the object to which it is to be removably secured. It may be secured thereon either before, during or after the object has been manufactured. A user may then pick-up, move and change the position of the object. The handle may be easily removed from the object, and removably secured to another object configured to receive the handle. Alternatively, the handle may remain attached to a particular object, or removed completely from all of the objects, as required by the user.

It will be apparent to one of ordinary skill in the art that various modifications and variations can be made in construction and configuration of the present invention without departing from the scope or spirit of the invention. Furthermore, aspects of the invention, which have been described in relation to particular embodiments, are not so limited. For example, either handle H or handle H1 may be used with any of the embodiments described herein, so long as knobs 10, 12 (or 10A, 12A or 10B, 12B) are configured to correspond to the handle being used. The specific configuration of recess 36 may also vary depending on the characteristics of the container, but preferably provides sufficient space for a user's hand. Therefore, it is intended that the present invention cover such modifications and variations of the invention, provided they come within the scope of the following claims and their equivalents.

I claim as follows:

1. A container with a removable handle, comprising:
   a container having spaced first and second knobs;
   a split tubular member having a central portion and spaced internal first and second contoured portions proximate opposite ends thereof, each of said contoured portions configured to receive one of said knobs, said first and second contoured portions being tensionably engaged with said first and second knobs when said central portion is grasped by a user, and at least two radially spaced openings extending through said central portion, said radially spaced openings axially aligned along an axis substantially perpendicular to a central axis of said split tubular member.

2. The container and removable handle of claim 1, wherein said split tubular member is formed from a flexibly resilient material.

3. The container and removable handle of claim 2, wherein said flexibly resilient material is plastic.

4. The container and removable handle of claim 3, wherein said split tubular member is injection molded plastic.

5. The container and removable handle of claim 1, wherein said two radially spaced openings are proximate said first contoured portion.

6. The container and removable handle of claim 5, wherein each of said openings has an elliptical configuration.

7. The container and removable handle of claim 5, wherein said central portion further includes third and fourth radially spaced openings proximate said second contoured portion.

8. The container and removable handle of claim 7, wherein said third and fourth radially spaced openings are axially aligned from each other.

9. The container and removable handle of claim 1, wherein each of said contoured portions is C-shaped in cross-section.

10. The container and removable handle of claim 9, wherein at least one of said contoured portions includes a dimple extending outwardly from a periphery of said contoured portion.

11. The container and removable handle of claim 1, wherein said central portion has a first diameter, and at least one of said contoured portions has a second diameter differing from said first diameter.

12. The container and removable handle of claim 11, wherein said second diameter is less than said first diameter.

13. The container and removable handle of claim 1, wherein said container is selected from the group consisting of a PET bottle, a plastic casing of an automotive battery, a plastic traffic barrier, and a plastic drum.

14. The container and removable handle of claim 1, wherein said first and second knobs are axially aligned.

15. The container and removable handle of claim 1, wherein said first and second knobs have an elliptical configuration.

16. The container and removable handle of claim 1, wherein said first and second knobs have a cylindrical configuration.

17. The container of and removable handle of claim 16, wherein at least one of said first and second knobs includes a lug extending outwardly from a side of said knob.

18. The container and removable handle of claim 1, wherein said split tubular member is formed from a material selected from the group consisting of metal and plywood.

* * * * *